UNITED STATES PATENT OFFICE.

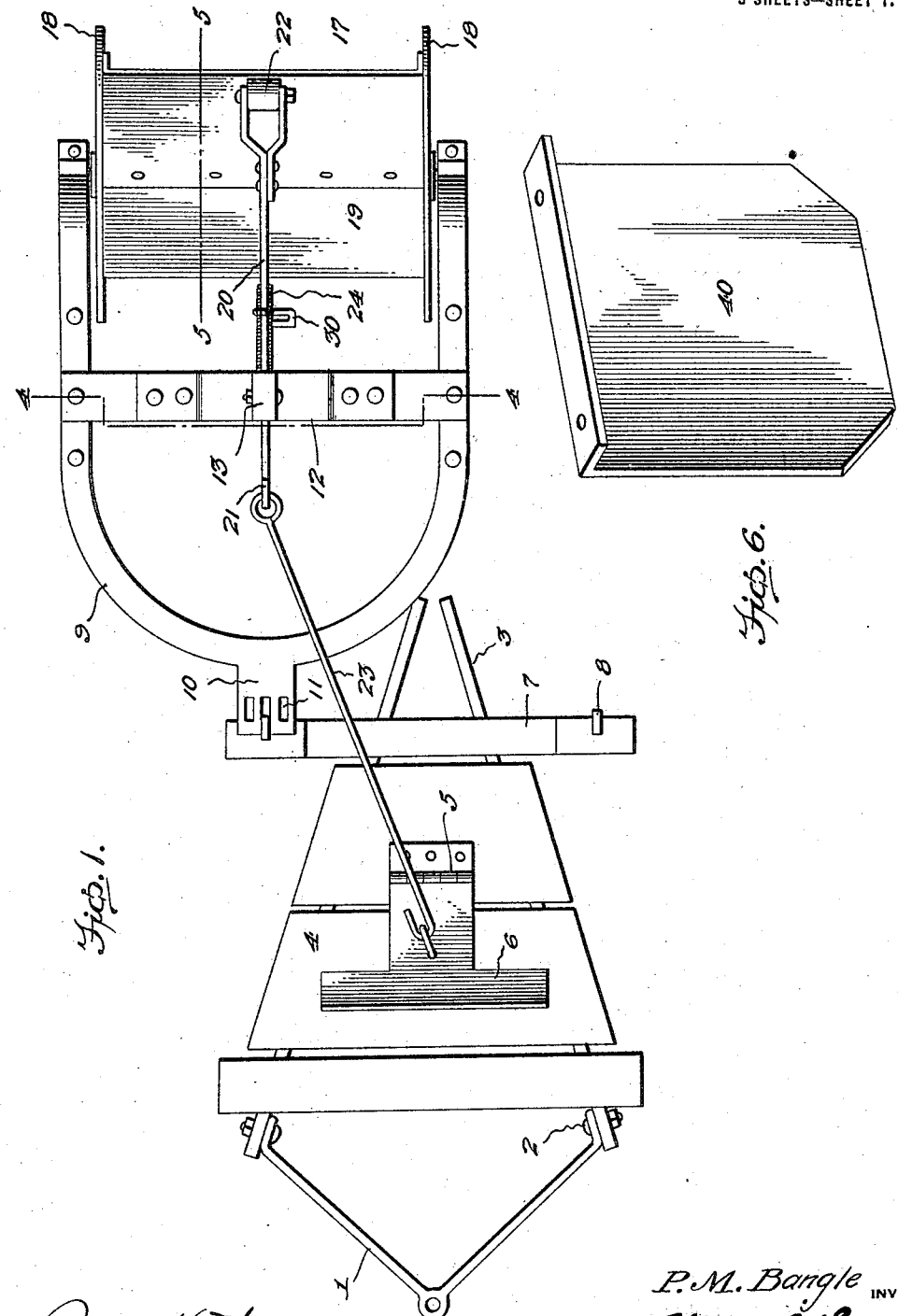

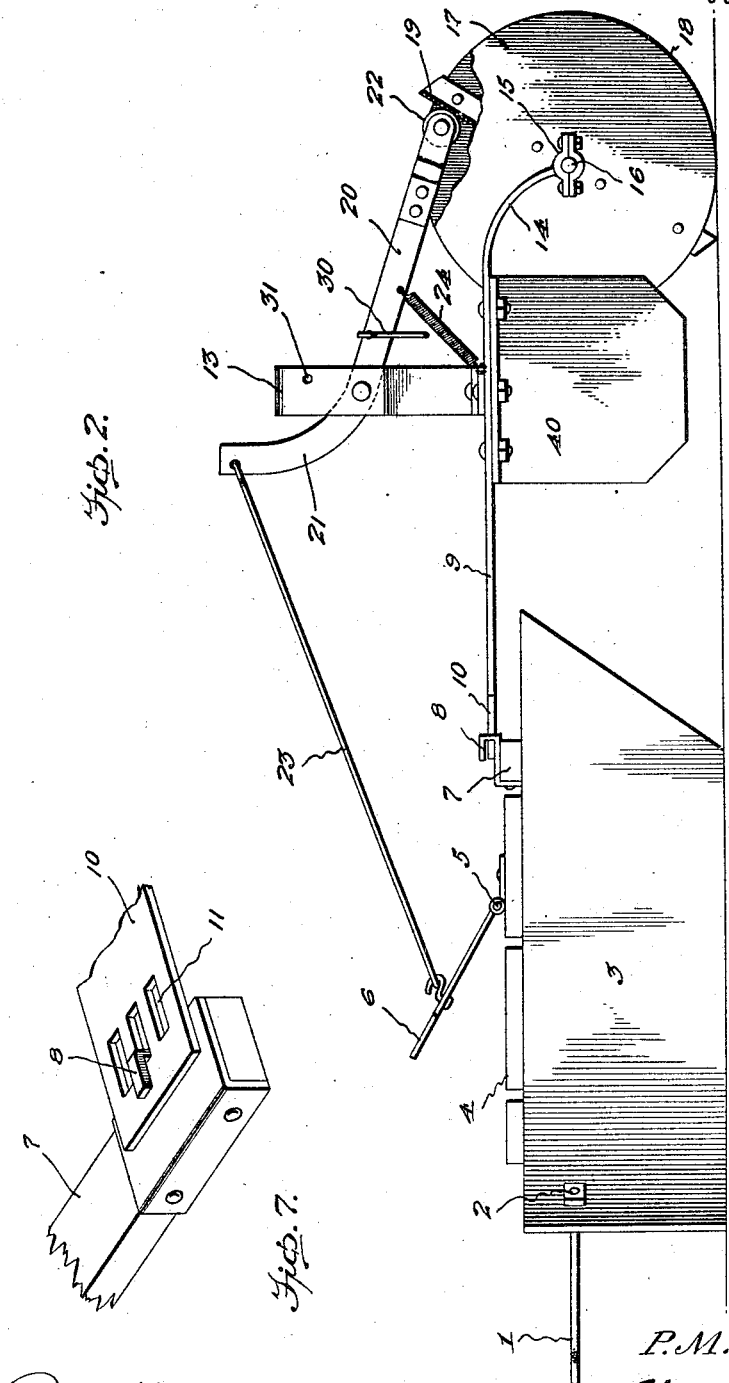

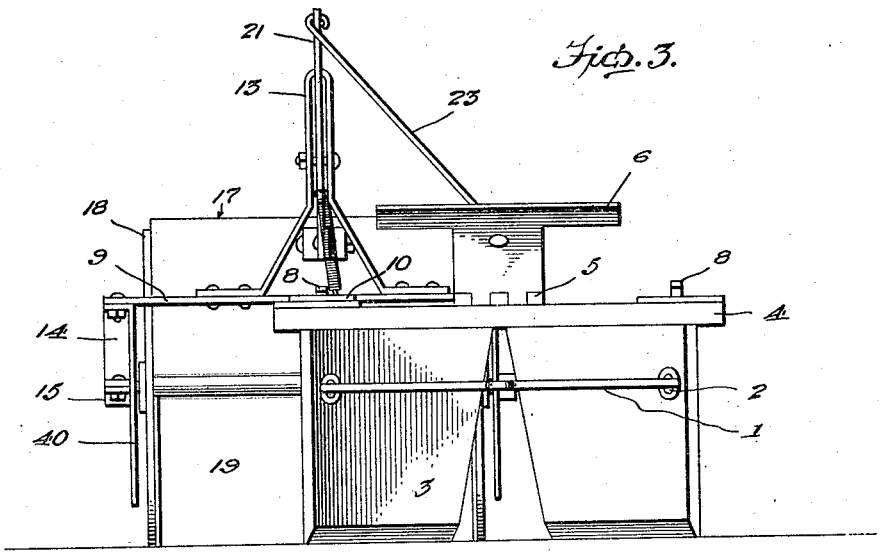
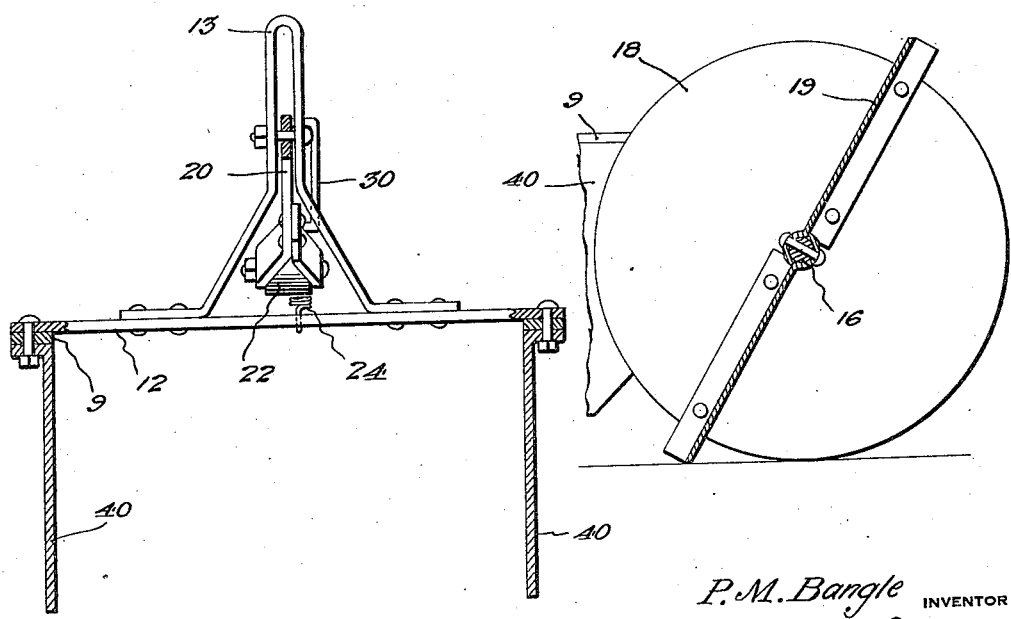

PAUL M. BANGLE, OF SAN DIMAS, CALIFORNIA.

EARTH-HANDLING APPARATUS FOR USE IN IRRIGATION.

1,419,101.	Specification of Letters Patent.	Patented June 6, 1922.

Application filed April 26, 1921. Serial No. 464,667.

*To all whom it may concern:*

Be it known that I, PAUL M. BANGLE, a citizen of the United States, residing at San Dimas, in the county of Los Angeles and State of California, have invented new and useful Improvements in Earth-Handling Apparatus for Use in Irrigation, of which the following is a specification.

The object of my invention is the provision of an apparatus constructed and arranged with a view to handling earth to advantage in the carrying out of irrigation projects.

To the attainment of the foregoing, the invention consists in the improvement as hereinafter described and definitely claimed.

In the accompanying drawings, forming part hereof:—

Figure 1 is a plan view of my improved apparatus.

Figure 2 is a side elevation of the same.

Figure 3 is a front elevation of the apparatus.

Figures 4 and 5 are sections taken on the lines 4—4 and 5—5, respectively, of Figure 1.

Figure 6 is a perspective on an enlarged scale of one of the fenders comprised in the apparatus.

Figure 7 is an enlarged fragmentary perspective of the coupling between the forward and rear units of the apparatus.

Similar numerals of reference designate corresponding parts in all of the views of the drawings.

My novel apparatus is adapted to be drawn by draft animals or by a tractor, and hence is provided at its forward end with a bail 1 designed for the connection of the draft animals or tractor. The said bail 1 is pivotally connected at 2 to the ridge-forming plates 3 comprised in the forward unit of the apparatus. The said plates 3 are rearwardly converged, as clearly shown in Figures 1 and 3; the rear comparatively close ends of the plates 3 defining the ridge as will be better understood from Figure 3. Superimposed on and fixed to the plates 3 are platform boards 4, and hinged at 5 to one of the said platform boards is a pedal lever 6. At this point I would have it understood that it is within the purview of my invention for the driver of the apparatus to occupy a seat on the forward unit of the apparatus or to stand on the platform, and in either event the driver is enabled at all times to conveniently operate the lever 6 with one of his feet. It will also be noticed by comparison of Figures 1 and 2 that a cross bar 7 is fixed on and extends laterally outward from the rear portions of the plates 3, and adjacent to its ends the said cross bar 7 is equipped with hooks 8, one of which is clearly illustrated in Figure 7. The two hooks 8 are preferably employed in order that the rear unit, hereinafter described, may be coupled to the forward unit at either side of the longitudinal center of the latter unit, according to the manner in which the apparatus is to be used as hereinafter described.

The rear unit of the apparatus includes an appropriate frame 9 of U-shape in plan; the said frame 9 being provided with a forwardly projecting tongue 10 in which is a transverse series of openings 11 for the reception of one hook 8. The transverse series of openings 11 is preferably resorted to in order that the coupling of the rear unit to the forward unit may be effected at different points in the width of the forward unit as conditions require. In addition to the U-shaped frame 9 the rear unit comprises a cross bar 12 on which is a standard 13. The rear portions of the side bars of the U-shaped frame 9 are deflected downwardly as indicated by 14 in Figure 2, and journaled in appropriate bearings 15 carried by the said portions 14 are journals 16 at the ends of a rotary earth depositor 17; the said rotary depositor having circular heads 18 and also having substantially diametrical blades scrapers or depositors 19 arranged between and fixed to the heads 18 and extending readily beyond the peripheries of the heads as appears in Figures 2 and 5. Fulcrumed in the standard 13 is a longitudinal, vertically swinging lever 20, having an upwardly deflected forward arm 21 and also having at its rear end an anti-friction roller 22. The forward arm of the said lever 20 is connected by a link 23 with the pedal lever 6, and consequently when the pedal lever 6 is depressed the rear arm of the lever 20 will be raised against the action of the spring 24 so as to carry the anti-friction roller 22 above and clear of the blade 19 that is at that time opposed to the roller 22, thereby releasing the rotary depositor 17 and enabling the depositor to turn incident to the forward progress of the apparatus. The spring 24 is interposed between the lever 20 and the frame of the rear unit of the apparatus, and is of the well known retractile type. It is sometimes desirable to secure the rear arm of the lever 20 in raised and idle position, and I therefore equip the said rear arm with a hook 30 adapted to be engaged with and disengaged from an aperture 31 in the standard 13. In addition to the elements enumerated the rear unit of the apparatus comprises fenders 40. The said fenders 40 are carried by the side bars of the frame 9 and are arranged at opposite sides of the forward portion of the rotary depositor 17 so as to confine the earth deposited by the said depositor.

In the practical use of my novel apparatus the same is drawn along a main ditch, and running at right angles to the main ditch are lateral ditches. The apparatus deposits earth at different intervals. Incident to the passage of the apparatus along the main ditch, the plates 3 serve to form a mound, and at desired intervals the operator of the apparatus depresses the pedal 6 so as to release the rotary depositor 17 in the manner hereinbefore indicated When the depositor 17 is released, the continued forward progress of the apparatus will bring about rotation of the depositor 17 about its axis with the result that the lowermost blade of the depositor will raise a body of earth, and will deposit the said earth between the fenders 40 with the result that one of the laterals of sub-ditches referred to will be dammed. On the release of the pedal lever 20 will be restored to the position shown in Figure 2 whereupon the turning of the depositor 17 will be stopped. It will also be apparent from the foregoing that at the will of the operator of the apparatus every other one of the laterals of sub-ditches at one side of the main ditch may be dammed, and when it is desired to dam certain of the sub-ditches at the opposite side of the main ditch, the rear unit of the apparatus may be shifted from one end of the bar end 7 to the opposite end thereof.

Having described my invention, what I claim and desire to secure by Letters-Patent, is:—

1. Earth handling apparatus comprising a forward unit having rearwardly converged mound-forming plates, a rear unit coupled to the forward unit at one side of the rear portions of said plates and having a rotary earth depositor with end heads and transverse blades extending between the heads and substantially throughout the length of the depositor and also having fenders for cooperation with said depositor, a spring control means carried by the rear unit and adapted in its normal position to prevent turning of the earth depositor, a lever on the forward unit, and a connection between the lever on the forward unit and the lever on the rear unit to position the latter lever for the rotation of the earth depositor.

2. Earth handling apparatus comprising a forward unit having rearwardly converged mound-forming plates, a rear unit coupled to the forward unit at one side of the rear portions of said plates and having a rotary earth depositor and also having fenders at the opposite ends of and at right angles to the depositor for cooperation with said depositor, a spring control means carried by the rear unit and adapted in its normal position to prevent turning of the earth depositor, a lever on the forward unit, and a connection between the lever on the forward unit and the lever on the rear unit to position the latter lever for the rotation of the earth depositor; the said rotary earth depositor being made up of circular heads and diametrical blades fixed to and extending between said heads and substantially throughout the length of the depositor and also extending outwardly beyond the peripheries of the heads and adapted to bring up against the rear end of the lever on the rear unit.

3. Earth handling apparatus comprising a forward unit having rearwardly converged mound-forming plates, a rear unit coupled to the forward unit at one side of the rear portions of said plates and having a rotary earth depositor and also having fenders at the ends of the depositor and at right angles thereto for cooperation with said depositor, a spring control means carried by the rear unit and adapted in its normal position to prevent turning of the earth depositor, a lever on the forward unit, and a connection between the lever on the forward unit and the lever on the rear unit to position the latter lever for the rotation of the earth depositor; the forward unit being also provided with means whereby the rear unit may be coupled to the forward unit at either side of the rear portions of the mound-forming plates.

4. Apparatus for use in irrigation comprising mound-forming means, a transverse rotary earth depositor arranged in rear of said mound-forming means and having depositor means extending at opposite sides of the mound-forming means, and manually controlled means whereby the earth depositor may be released for operation at intervals.

5. Apparatus for use in irrigation comprising mound-forming means, a rotary earth depositor arranged in rear of said mound-forming means, and manually controlled means whereby the earth depositor may be released for operation at intervals, in combination with fenders arranged at opposite sides of the rotary earth depositor and extending forwardly to said depositor, and also arranged in rear of the mound-forming means.

6. In an apparatus for use in irrigation, the combination with a transverse rotary earth-depositor including circular heads and diametrical blades extending between the heads and substantially throughout the length of the depositor and outwardly beyond the peripheries thereof, of a frame in which the depositor is mounted to rotate, and a lever spring controlled and mounted on the said frame and normally arranged in opposed relation to one of the blades to prevent rotation of the rotary depositor.

In testimony whereof I affix my signature.

PAUL M. BANGLE.